INVENTOR
PAUL BECKMAN

BY  *Arnold C. Rood*

ATTORNEY 3,158,827
TEMPERATURE COMPENSATED ELECTRICAL
STRAIN GAGE
Paul Beckman, 944 Henrietta Ave.,
Huntingdon Valley, Pa.
Filed Oct. 8, 1962, Ser. No. 229,061
1 Claim. (Cl. 338—3)

This invention relates to temperature compensated strain gages of the bonded electrical resistance type.

Many attempts have heretofore been made to provide gages of this type but they have been deficient either structurally, functionally or economically. In some instances, the prior gages have employed a dummy gage bonded to an element constructed from material the same as that of the specimen whose strain is to be measured but such gages were not of the self-contained type in that the dummy material had to be placed in an unstrained relation to the specimen. Most practical strain gage applications do not consist of the proper conditions to permit use of such a device. In other instances, the dummy gages have been loosely supported in an environment which only approximates the actual temperature changes in the specimen, and accordingly are limited as to the rate of response to temperature changes and to the magnitude of the temperature range of practical operation. These, as well as other, functional deficiencies arise from the fact that the dummy gage by not being bonded has a different temperature than the bonded gage and cannot sense the normal expansion of the specimen material.

It is an object of my invention to provide an improved temperature compensated gage of the dummy type which overcomes the above deficiencies of both the bonded and unbonded types heretofore used.

A further object is to provide an improved dummy temperature compensated strain gage of the electrical resistance filament type in which both the strain responsive filament and the temperature compensating filament are of the bonded type, and yet will eliminate the deficiencies of the prior art as above pointed out.

Another object is to provide an improved temperature compensated gage of the electrical resistance filament bonded type that is relatively simple and economical in construction and manufacture and has a high degree of effectiveness in its accuracy and sensitivity.

A still further object is to provide an improved dummy temperature compensated strain gage which is small in transverse dimension such that it may be used for either surface or internal strain measurements.

Other objects and advantages will be more apparent to those skilled in the art from the following description of the accompanying drawings in which.

Figure 1:
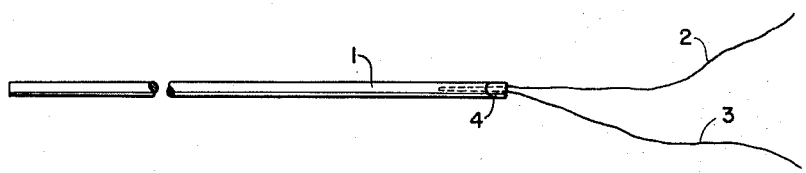
FIG. 1 is a greatly magnified side elevation of a lead with the strain sensitive filaments attached thereto prior to being formed into the final gage.
Figure 2:
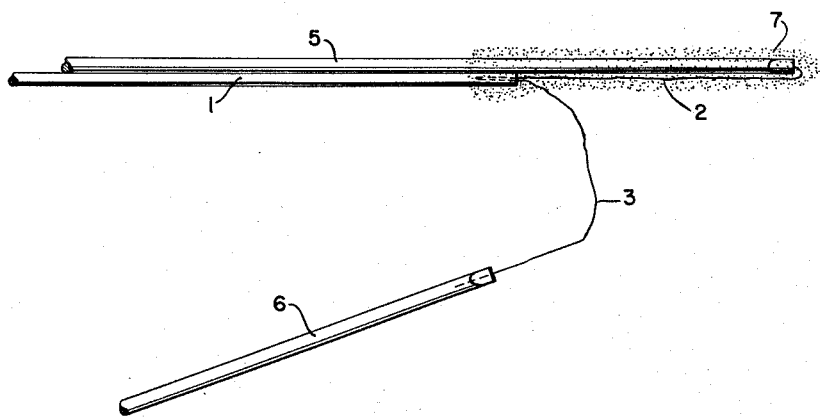
FIG. 2 is a greatly magnified side elevation showing the next step in the formation of the gage with two other leads added.
Figure 3:
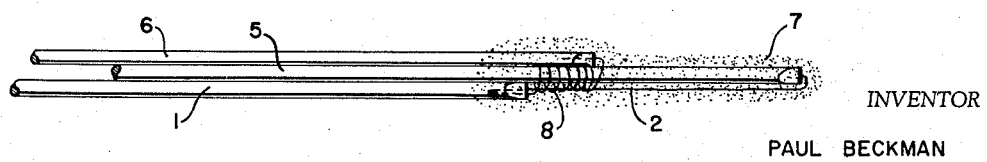
FIG. 3 is a similarly greatly magnified side elevation of the completed gage.

In the particular embodiment of my invention I provide a common lead 1 preferably of nickel, platinum, Nichrome, Karma, etc. The miniaturized size of my gage will be appreciated from the fact that outside diameter of lead 1 is .005" to .007". A pair of strain sensitive elements 2 and 3 are electrically and mechanically connected at 4 to the end of the lead 1 as to form an integral unit. This connection may be by inserting the leads within the tube and swaging the end thereof on to the filaments or in any other desired manner such as by either staking or welding the filaments on the lead. The elements 2 and 3 are made of any desired strain sensitive electrical resistance material well-known in the art such as Nichrome, Nichrome 5, or Karma for high temperature work, although other materials such as constantan or Evanome may be used for lower temperatures. It is desirable to have the lead 1 and other leads to be described of the same material as the sensitive filaments. Other leads 5 and 6 are electrically and mechanically connected to the free ends of the sensitive filaments 2 and 3. The leads 1 and 5 are then placed against each other but in longitudinally offset relation so that the sensitive filament 2 lies lengthwise over one portion of filament 5, but in slightly spaced relation thereto. The leads 1 and 5 and filament 2 are then partially covered with a ceramic cement 7 so as to form a partial unit. The ceramic cement will also insulate the sensitive filament 2 from the lead 5. The sensitive filament 3 is now wound on the ceramic cement 7 around the lead 5 and sensitive filament 2 starting from the right end of lead 1 and preferably progressing toward the right end of lead 5 thereby to produce a spiralled area 8 as shown in FIG. 3. The entire right end of all the leads and the two sensitive filaments are now covered with a second coat of ceramic cement to provide a unitary gage.

Thus it is seen that I have provided an extremely compact self-contained temperature-compensated gage of electrical resistance type in which the dummy filament 3 and strain responsive filament 2 are so intimately bonded together that they are simultaneously subject to any temperature change. It will be understood that the leads are connected in any usual well-known circuit for measuring the changes in electrical resistance of elements 2 and 3. The gage in its completed form is, of course, a half-bridge which would form two arms of the usual Wheatstone bridge.

One of the desirable results of my improved combination is the extremely small transverse dimension of the gage. For instance, it is of miniaturized size in that with leads of the indicated size the overall width of the gage would not be more than .020". This makes my invention ideally suited for use in transducers where installation may be in a small hole on the axis of the load column, thus eliminating the effects of bending in the transducer.

It will, of course, be understood that various changes in details of construction and arrangement of parts may be made by those skilled in the art without departing from the spirit of the invention as set forth in the appended claim.

I claim:

A temperature-compensated strain gage of the electrical resistance filament type comprising a strain sensitive filament, leads connected to each end of that filament, a temperature compensating filament disposed in a transverse direction with respect to the strain sensitive filament, and means for bonding the two filaments and leads as a self-contained unit, said combination being further characterized in that the temperature compensating filament is connected to one of the leads and a third lead is connected to the other end of the temperature compensating filament, the three leads being disposed along side of each other with the strain sensitive filament lying along the lengthwise portion of one end of one of its leads, the temperature compensating filament being wound around the strain sensitive filament in a direction extending between the ends of the two leads connected to the strain sensitive filament, and all of the leads and filaments being bonded together and insulated from one another by a bonding material.

References Cited in the file of this patent
UNITED STATES PATENTS

| | | |
|---|---|---|
| 2,729,730 | Brady | Jan. 3, 1956 |
| 2,948,872 | Beckman | Aug. 9, 1960 |